Jan. 3, 1950 M. L. HATFIELD 2,493,287
SCOOTER
Filed Aug. 19, 1946 3 Sheets-Sheet 1

INVENTOR
MILTON L. HATFIELD
BY Liverance
and
Van Antwerp
ATTORNEYS

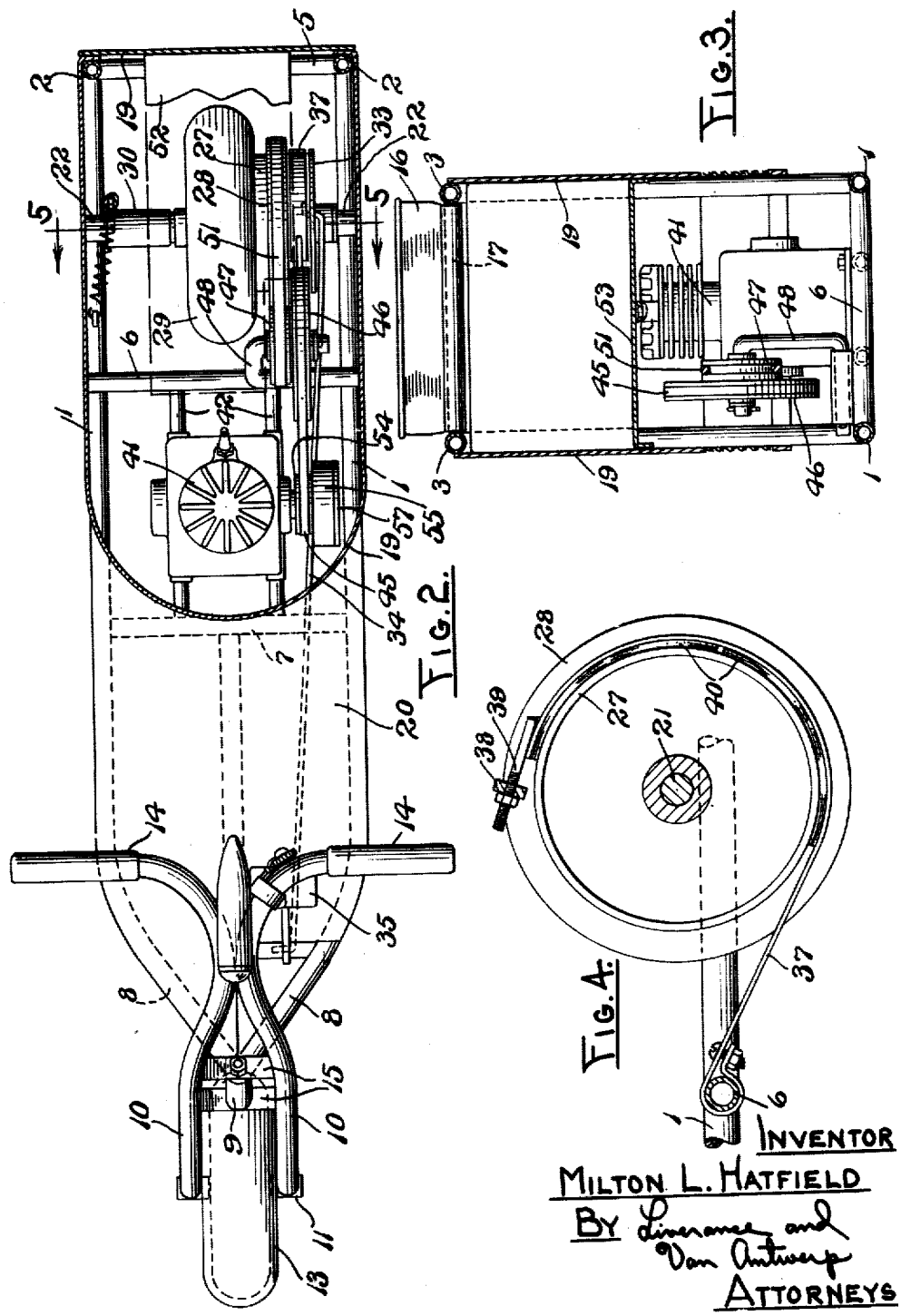

Jan. 3, 1950 M. L. HATFIELD 2,493,287
SCOOTER
Filed Aug. 19, 1946 3 Sheets-Sheet 3
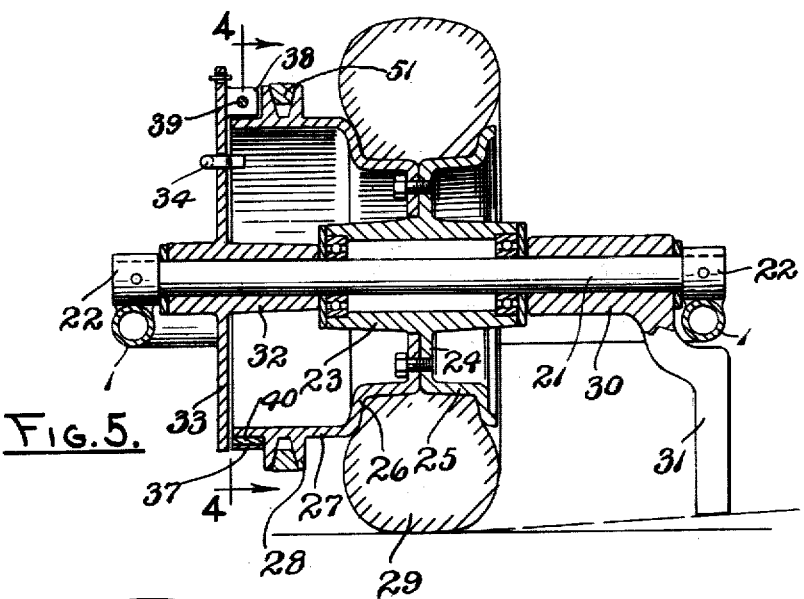
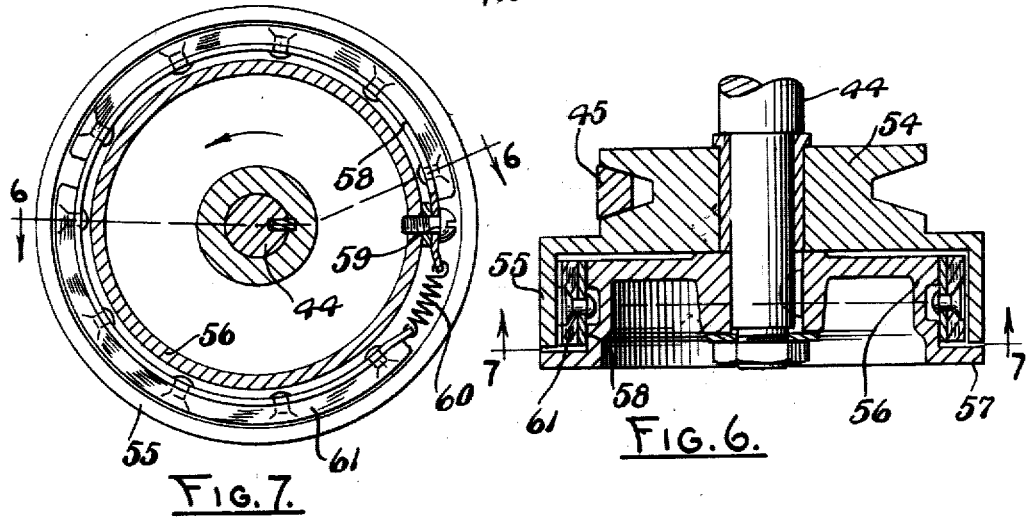
INVENTOR
MILTON L. HATFIELD
BY Linerance and
Van Antwerp
ATTORNEYS Patented Jan. 3, 1950

2,493,287

UNITED STATES PATENT OFFICE 2,493,287

SCOOTER

Milton L. Hatfield, Coldwater, Mich.

Application August 19, 1946, Serial No. 691,499

3 Claims. (Cl. 180—33)

The present invention relates to a novel construction of scooter, the name by which engine driven two wheeled vehicles are known and in which the wheels are a front and a rear wheel, with a framework structure between, the rear wheel being engine driven and the front wheel mounted for a change of direction or steering, the scooter in some respects being similar to a bicycle.

It is a primary object and purpose of the present invention to provide a novel and economically constructed scooter structure, in which the weight is minimized without detriment to strength, and the driving and braking of the rear wheel is accomplished in a novel, very practical simple and effective manner. A further object of the invention is to produce a novel construction of rear wheel drive and brake therefor of great strength and durability and of a very simple and practical structure. The scooter construction of my invention has been produced and marketed in quantity and is continuously made and sold and has proven exceptionally satisfactory for the purposes for which it is designed.

An understanding of the invention may be had from the following description, taken in connection with the accompanying drawings, in which, Fig. 1 is a partial side elevation and longitudinal vertical section through the scooter of my invention.

Fig. 2 is a partial plan view and longitudinal horizontal section therethrough.

Fig. 3 is a transverse vertical section substantially on the plane of line 3—3 of Fig. 1.

Fig. 4 is a vertical section substantially on the plane of line 4—4 of Fig. 5 showing the detail of the brake.

Fig. 5 is a transverse sectional elevation on the line 5—5 of Fig. 2.

Fig. 6 is a substantially horizontal section on the plane of line 6—6 of Fig. 7, and Fig. 7 is a vertical section on the plane of line 7—7 of Fig. 6, illustrative of the structure of the automatic driving clutch between the engine and the rear driven wheel.

The sectional views illustrated are taken in the direction indicated by the arrows and like reference characters refer to like parts in the different figures of the drawings.

Figure 1:
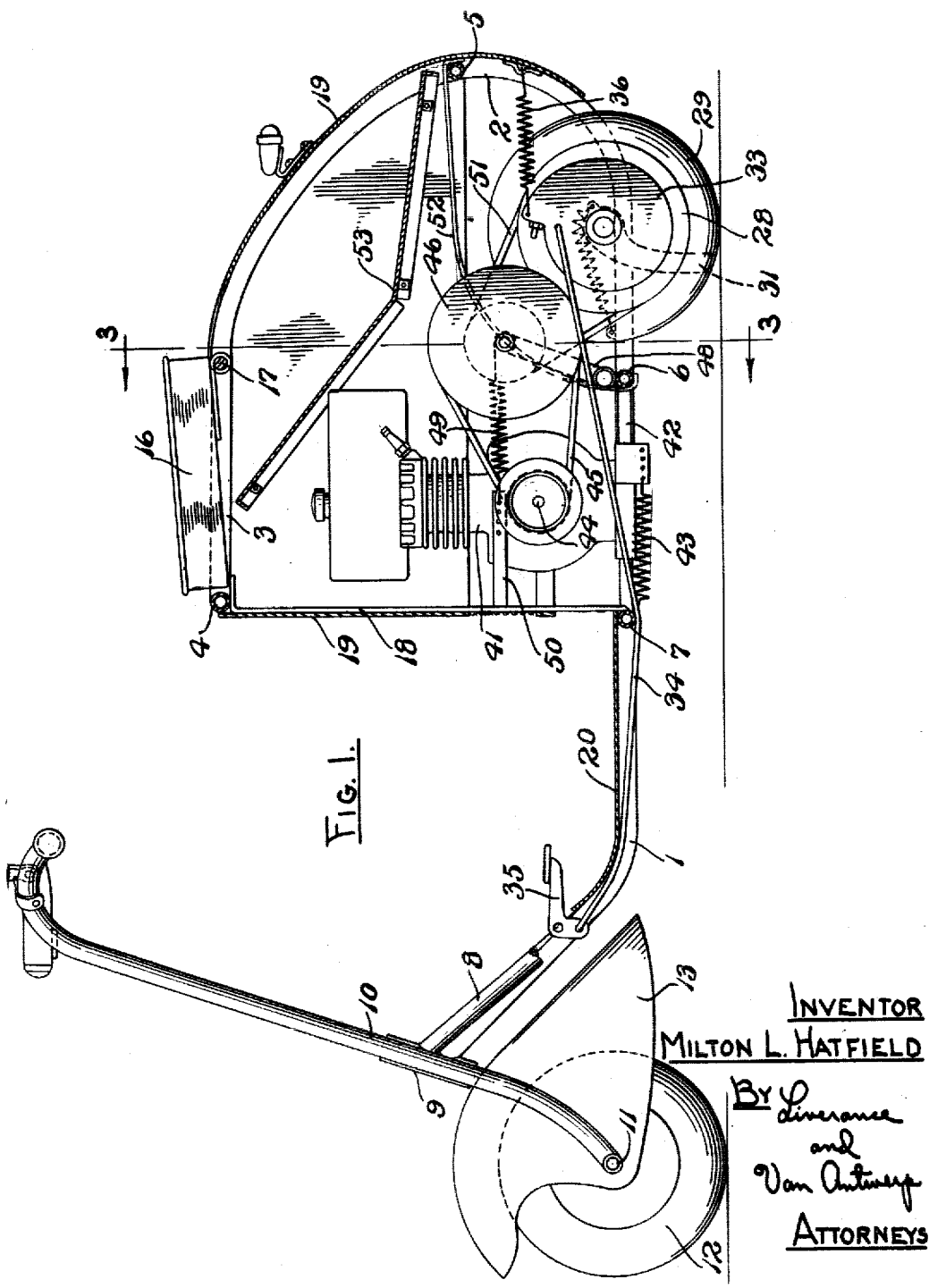

The scooter frame includes two tubular spaced chassis side frame members, the intermediate portions 1 of which are disposed horizontally. The rear portions are curved upwardly and thence in a forward direction as indicated at 2, terminating in horizontal end sections 3 located above the horizontal lower sections 1 and connected at their forward ends by a tubular cross frame member 4. The spaced tubular sections 1 and 2 are connected by spaced cross members 5, 6 and 7, the last located substantially directly below the cross member 4 described. At their front end portions the chassis side frame members are extended upwardly and forwardly and converge toward each other as at 8, and connected with a sleeve 9 which is inclined rearwardly at an acute angle to the vertical, as shown. The frame members described are permanently and inseparable connected by welding or other equivalent means of connection.

At the front of the frame a steering structure is mounted, including two tubular members 10 which are bent inwardly toward each other between their upper and lower ends and permanently connected together, and at their lower ends provided with suitable bearings to receive the ends 11 of the shaft of a front wheel 12 located between the members 10. The wheel 12 may be covered at its upper side by a shield 13 of thin metal, as shown. Above the connection of the two tubular members 10, they are continued and bent outwardly in opposite directions at the end portions of which handles 14 are mounted. Such structure provides a steering fork and front wheel mounting. Transverse bars 15 (Fig. 2) welded to and extending between the members 10, one above and the other below the sleeve 9, serving as supports for a steering spindle or shaft which extends through the sleeve and is connected at its ends to the bars 15.

At the rear ends of the upper horizontal sections 3 of the frame, substantially at their junctures with the curved sections 2, a horizontal transverse rod 17 is located upon which a seat 16 is pivotally mounted at its rear under portion, the seat at its front and at its lower side being adapted to rest upon suitable supports 18 extending between the transverse frame members 4 and 7. The rear portion of the scooter frame structure is enclosed by a sheet metal covering 19, open at its lower side, and from the front frame member 7 a sheet metal floor 20 extends forward substantially to the sleeve 9, being connected to and supported by the transverse frame member 7 and the sections 1 and 8 of the chassis side members of the frame.

A horizontal axle rod 21 extends between the horizontal sections 1 of the frame toward their rear ends, the ends of the rod being fixed in sleeves 22 welded or otherwise connected at the upper sides of the frame parts 1 (Fig. 5). A wheel hub 23 is rotatably mounted on the rod 21 substantially at its mid portion. Integral with the hub 23 is an annular disc or web 24 which, at its outer edges, is continued, as at 25, providing one-half of a tire receiving rim. The other half of the rim at 26 is provided with a disc or web at its inner end lying along side of the web or disc 24 and connected thereto by screws as shown. The rim part 26 is extended outwardly into a drum 27 around which between its ends, spaced belt receiving ribs are integrally formed as indicated at 28. A tire 29 is mounted around the rim provided by the two rim parts or halves 25 and 26. Between one end of the hub 23 and one of the sleeves 22 a sleeve 30 is mounted upon the rod 21 which has an arm 31 extending therefrom adapted to be turned to a down position, as shown in Fig. 5, so that the scooter may be held in a generally upright position by tilting it slightly to one side bringing the end of the arm 31 into contact with the ground. The arm 31 is spring actuated as indicated at dotted lines as in Fig. 1 so that when free to do so, it will occupy its supporting position. It may be turned upwardly to inoperative position and releasably held therein, the structural detail for accomplishing which is no part of the present invention and is not disclosed.

A hub 32 is loosely mounted on the rod 21 at the opposite end of the hub 23 and between it and the other sleeve 22, extending partially into the drum 27. A plate 33 integral with the hub 32 closes the outer end of the drum. A brake rod 34 is connected with the plate 33 above the center thereof and extends forward underneath the frame member 7 to the front portion of the scooter, having connection with a foot pedal 35, the operation of which will turn the plate 34 in a counterclockwise direction (Fig. 1) against the resistance of a spring 36 which returns it to its initial position upon freeing the brake foot pedal 35. As shown in Fig. 4, a band 37 is connected at one end to the cross frame member 6 of the scooter frame and extends to the rear underneath, thence upwardly at the rear and partially over the outer end portion of the drum 27 beyond the belt engaging ribs 28. A lug 38 extends inwardly from the plate 33, through which a threaded rod 39 welded to the other end portion of the band 37 passes having a nut thereon for adjustment. The band 37 at its inner side, substantially around the rear half of the drum 27 is lined with brake lining material 40. It is evident that upon pushing down upon the brake pedal 35, the rear wheel will be braked and slowed in rotative movement by the frictional engagement of the brake linings 40 against the drum 27.

The engine 41 for driving the scooter, is mounted at its base on horizontal rods 42 extending between the transverse frame rods 6 and 7 and is located underneath the seat 16. It is pulled away from the rear axle rod 21 by tension springs 43 connected to the rod 7 and to a plate on the engine base having several openings (Fig. 1) for varying the tension or compensating for stretching of the belts, later described, used to transmit power from the engine to the rear wheel. On the engine shaft 44, a driving pulley and clutch, later specifically described, is secured, driving an endless belt 45 which passes around a driven grooved wheel or pulley 46 which, together with a smaller pulley 47, is rotatably mounted on a bracket 48 which turns about a horizontal axis. The bracket 48 made from rod material has upper and lower horizontal legs connected by an integral generally vertical section.

Pulleys 46 and 47 are mounted upon the upper leg, the lower horizontal leg having a rocking mount in a sleeve connected to the frame and disposed above the transverse frame rod 6. Such rocking bracket is acted upon by a tension spring 49 normally pulling it to the front and adjustable at its front by different connections to a bar 50, as shown in Fig. 1.

The smaller pulley 47 drives an endless belt 51 which passes between the driving ribs 28 on the drum 27, to thereby drive the rear wheel through the belts 51 and 45 from the engine. A reinforcing plate 52 extends between the transverse rods 5 and 6, of the shape shown in Fig. 1, and a transverse plate 53 in two sections angularly disposed to each other extends between the sides of the housing 19 at the rear portion of the scooter, forming a compartment, entrance to which is obtained by turning the seat 16 to the rear.

The driving pulley and clutch, shown in Figs. 6 and 7, is connected at the outer end of the engine shaft 44. It includes an integral driving pulley 54, grooved to take the belt 45, and an annular drum 55 extending outwardly at its outer side. Such pulley and drum are loosely mounted on the engine shaft 44. An inner clutch member 56 of a cylindrical form is keyed to the shaft 44 and has an outer flange 57, at its edge portions extending over the outer end of the drum 55. A flexible metal band 58 is permanently connected near one end, at 59, to the inner clutch member 56 and extends around it, the two ends of the band approaching each other but being spaced a short distance apart and connected by a tension spring 60. At the outer side of the metal band 58, clutch lining members 61 are permanently secured which, when the engine is at rest or is turning below a preselected speed of rotation, that is idling speed, is held away from the inner surface of the drum 55 by the spring 60. Upon attainment of speeds of the engine shaft above idling, the free end of the clutch band is thrown outwardly by centrifugal action and a driving connection is made between the inner clutch member 56 and the surrounding drum 55, thereby driving the rear wheel of the scooter from the engine. The control of engine speed is by means of a throttle mounted on the front steering structure adjacent one of the handles 14, and the scooter is stopped by controlling the throttle by reducing the speed of the engine to idling and braking the rear wheel by pressure upon the brake pedal 35.

The construction described is economical to build, of ample strength and sturdiness coupled with relatively light weight. The rear wheel structure with its driving and braking elements in conjunction therewith is particularly practical and useful being readily produced and assembled and because of its simplicity of structure, it is certain and sure in operation and does not readily get out of order so as to require repair. The tension of the belt is maintained by the springs 43 and 49. The simplicity of structure of the drive of the scooter and its control is a valuable feature of the present invention.

The invention is defined in the appended claims and is to be considered comprehensive of all forms of structure coming within their scope.

I claim:

1. In a structure as described, a frame support adapted to be located in a generally horizontal position, a rear axle connected to and located transversely of the rear portion of the frame, a rear wheel mounted thereon for rotative movement, an engine located in front of the rear wheel, means for slidably mounting the engine on the frame, spring means connected with the engine to normally pull it forward away from said wheel, a bracket mounted for rocking movement about a horizontal axis connected with said frame between the engine and rear wheel, said bracket extending upwardly therefrom, two pulleys located adjacent each other mounted on said bracket to turn about a horizontal axis, an endless driving belt around one of said pulleys operatively connected with the engine, and a second endless belt around the other of the pulleys extending around and operatively connected with said drum.

2. In a scooter construction as described, a generally horizontal chassis frame, an engine slidably mounted on and extending above said frame, spring means tending to move the engine in a forward direction, a rear driving wheel, an axle connected with said frame on which the wheel is rotatably mounted, a bracket mounted for rocking movement on the frame between the engine and rear wheel, two driving pulleys located side by side mounted to turn together about a horizontal axis on said bracket above the frame, a belt connection between the engine and one of said pulleys, a second belt connection between the other of said pulleys and the drum, and spring means for normally rocking said bracket in a forward direction about its axis of movement.

3. In a structure as described, a frame having spaced side chassis frame members disposed in a generally horizontal plane, a rear driven wheel mounted to turn about a horizontal axis at the rear portion of the frame, an engine slidably mounted on the frame forward of said wheel, yielding means normally pulling the engine in a forward direction, two connected pulleys located side by side between the engine and rear wheel drum, means for movably mounting said pulleys on the frame for movement toward or away from said engine and wheel, yielding means moving said pulleys toward said engine, means for driving one of said pulleys from the engine including an endless belt, and a second means including an endless belt for driving said rear wheel from the other of said pulleys.

MILTON L. HATFIELD.

REFERENCES CITED

The following references are of record in the file of this patent:

UNITED STATES PATENTS

| Number | Name | Date |
| --- | --- | --- |
| 1,164,122 | St. Yves | Dec. 14, 1915 |
| 2,225,914 | Lewis et al. | Dec. 24, 1940 |
| 2,256,461 | Burns | June 16, 1942 |
| 2,397,858 | Hare | Apr. 2, 1946 |
| 2,409,757 | Hetzel et al. | Oct. 22, 1946 |